March 10, 1953 H. J. SHAFER 2,630,829
VALVE OPERATING MECHANISM
Filed July 30, 1947
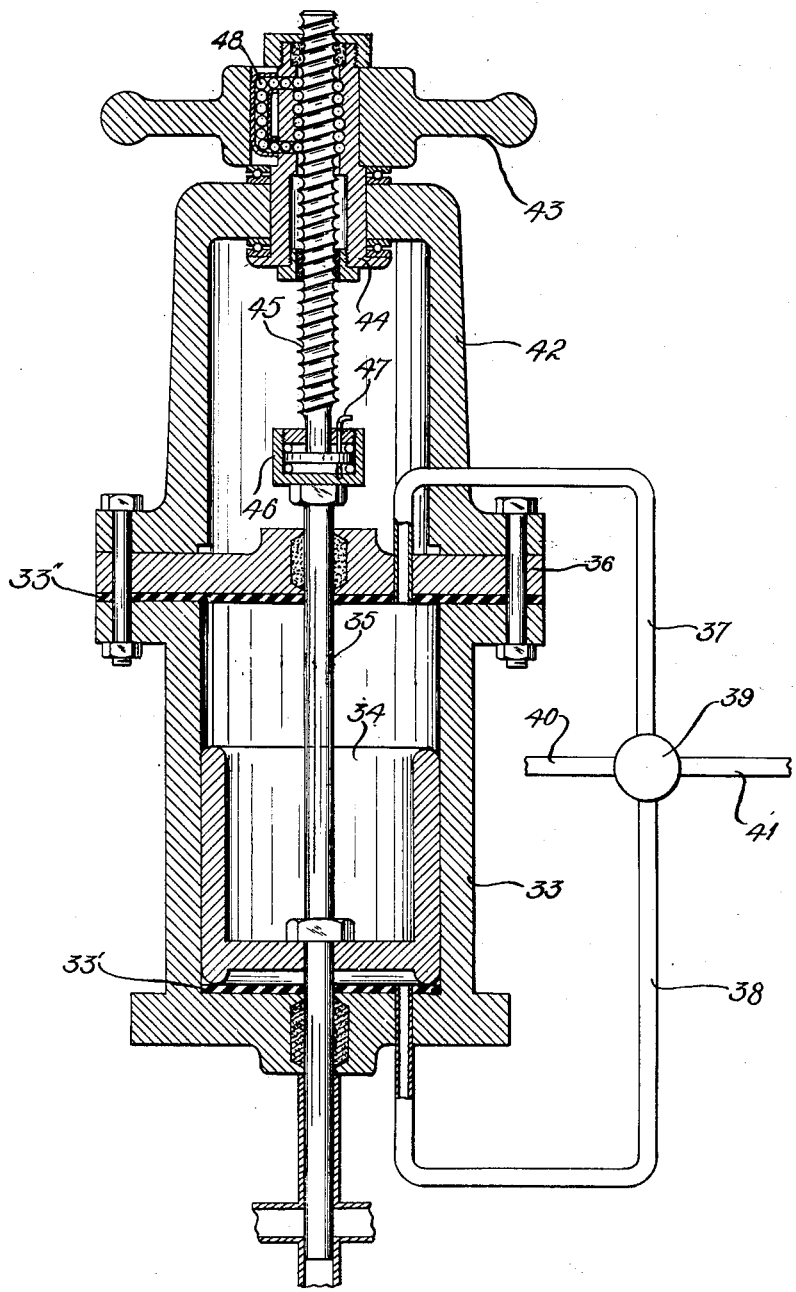
INVENTOR:
HOMER J. SHAFER
BY Alfred F. Dees
ATTORNEY.

Patented Mar. 10, 1953

2,630,829

UNITED STATES PATENT OFFICE 2,630,829

VALVE OPERATING MECHANISM

Homer J. Shafer, Mansfield, Ohio, assignor to The Shafer Valve Co., Mansfield, Ohio, a corporation of Ohio Application July 30, 1947, Serial No. 764,603

3 Claims. (Cl. 137—641)

This invention relates to valve operating mechanisms and in its more specific aspects is directed to a device for materially reducing friction losses in the portion of the mechanism that operates the movable element of the valve.

The object of the invention is to provide a combination manual and pressure fluid operated mechanism for a valve so that each may selectively operate the valve and in which the low friction screw and piston rod of the pressure fluid motor may jointly or severally operate the movable element of the valve.

Other and further objects of the invention will occur to those skilled in the art to which the subject matter hereof pertains as the description proceeds which taken in connection with the accompanying drawing sets forth a preferred embodiment which is not to be construed as limitation of the invention which is limited only by the appended claims and any and all modifications, alterations and variations of structure coming within the spirit and scope thereof are deemed to be included herein.

In the drawing:

The single figure of the drawing shows a view of a combined manual and pressure fluid operated device, incorporating the invention, for the movable element of a valve.

One embodiment of the valve operating mechanism is disclosed in the single figure of the drawing in which 33 is the cylinder of a valve operating motor provided with a piston 34 to which a piston rod 35 is secured. One end of the rod 35 is securable to the movable element of a valve (not shown) and the other end of the rod is securable to a manually operated valve opening and closing mechanism to be subsequently defined and described.

The cylinder is provided with a suitable closure 36 and appropriate gasket material is provided that functions as a valve seat 33' and 33" at either end of the cylinder. This material cooperates with the rounded ends of the skirt of the piston at each end thereof, said rounded ends acting as valves to prevent the escape of pressure fluid past the piston when it is in either extreme end position in the cylinder 33. This eliminates the need for pressure rings in the piston. It is understood that suitable stuffing boxes, well known to the art are provided in the ends of the cylinder to prevent the escape of pressure fluid past the piston rod 35.

A suitable pressure fluid circuit is illustrated to operate and control the reciprocation of the piston and thereby the opening and closing of the valve connected thereto, which consists of conduits 37 and 38 one end of each being connected to each end of the cylinder 33 and with their opposite end being connected to a reversing valve 39. A conduit 40 has one end connected to a suitable source of pressure fluid supply and its other end is connected to the valve 39 with conduit 41 connected to valve 39 to direct exhaust pressure fluid away from the valve.

The manually operated mechanism for reciprocating the piston 34 and the valve member connected to the piston rod 35 comprises a frame 42 suitably secured to cylinder closure 36. A hand wheel 43 is secured to the supporting member 44 rotatably mounted in the frame 42 and one end of the member 44 has a spiral raceway formed therein for ball bearings or other suitable anti-friction members 48 and the other raceway is formed on the screw or rod 45. The anti-friction members are assembled and retained in the raceways. The rod 45 is connected to the piston rod 35 through a coupling 46 one portion of which is rigidly connected to piston rod 35 and the other portion of which is rigidly connected to the rod 45. Suitable thrust bearings are disposed between the portions of the coupling so that under some circumstances of operation the two portions may rotate relatively.

The operation of this device is as follows: When the valve connected to the piston rod 35 is to be opened or closed by pressure fluid then reversing valve 39 is set to the proper position. Peg or pin 47 connected between the portions of the coupling 46 is removed to prevent any possible rotation of the piston rod 35 and that rods 35 and 45 may relatively rotate when the piston 34 operates the valve connected to the rod 35. By reason of the low friction between rod 45 and the nut formed in the member 44 the rod 45 will rotate relative to the hand wheel 43, while the piston 34 reciprocates. In the event it is desired to open and close the valve connected to piston rod 35 manually then the pin 47 is inserted in the coupling 46 to rigidly connect the portions thereof so that when hand wheel 43 is rotated rods 35 and 45 will be moved along their major axis. A suitable cutoff valve may be connected in the pressure fluid supply line 40 so that all pressure fluid may be exhausted from the cylinder 33 so that the hand wheel 43 may freely move the piston.

In some constructions it will be desirable to make rods 35 and 45 in a one piece or unitary construction thereby eliminating the coupling 46 and when so constructed hand wheel 43 must always rotate about rods 35 and 45.

The valve connected to piston rod 35 will be opened and closed as the piston rod and piston are moved either by the handwheel 43 or by pressure fluid applied to either end of the piston under the control of the valve 39.

That which is regarded new, novel and useful and which is sought to be protected by Letters Patent of the United States of America is as follows:

1. In a movable valve member operating mechanism, a pressure fluid cylinder having a piston therein provided with a piston rod that is connected to the movable valve member; pressure fluid means to control the reciprocation of the piston; an anti-friction nut and screw member associated with said rod which when manually rotated relative to each other will reciprocate said piston and said valve member and a coupling connecting said piston rod and screw having relatively rotatable parts whereby said rod and screw can rotate with or relative to each other.

2. In a valve operating mechanism, a pressure fluid cylinder having a movable piston therein; a rod associated with said piston and connected to a valve element movable toward and away from a valve seat; other rod means associated with said piston, one portion of which has a spiral anti-friction element raceway formed thereon; a nut on said other rod provided with a spiral anti-friction element raceway; anti-friction elements disposed between said raceways; means to control the admission of pressure fluid to said cylinder to reversibly move said piston and said movable valve member; means associated with said nut to rotate same to thereby move said other rod to reversibly move said piston and said movable valve member and a coupling connecting said rod and said other rod having relatively rotatable parts whereby said rods can rotate relative to each other and including means for causing them to rotate together.

3. In a valve operating mechanism, a pressure fluid cylinder having a reversibly movable piston therein that is operatively associated with a valve member which is movable toward and away from a valve seat; a rod connected to said piston, one portion of said rod provided with a spiral anti-friction element raceway thereon; a nut on said rod provided with a spiral anti-friction element raceway that is complemental to the raceway on said rod; anti-friction elements disposed between said raceways; a handwheel associated with said nut to rotate said nut to thereby reversibly move said piston and the valve member associated therewith toward and away from the valve seat; means to control the admission of pressure fluid into said cylinder to reversibly move said piston and move the valve member toward and away from the valve seat and means connecting said stem portion to the remaining portion of the stem and having relatively rotatable parts whereby said stem portions are rotatable relative to each other.

HOMER J. SHAFER.

REFERENCES CITED

The following references are of record in the file of this patent:

UNITED STATES PATENTS

| Number | Name | Date |
|---|---|---|
| 477,642 | Brunthaver | June 28, 1892 |
| 1,565,805 | Jones | Dec. 15, 1925 |
| 1,806,305 | Mueller | May 19, 1931 |
| 1,851,428 | Hough | Mar. 29, 1932 |
| 1,888,392 | Penick | Nov. 22, 1932 |
| 2,127,335 | Hodgson | Aug. 16, 1938 |